(12) United States Patent
Pulley, IV et al.

(10) Patent No.: US 6,222,557 B1
(45) Date of Patent: Apr. 24, 2001

(54) NAVIGATION SYSTEM AND METHOD FOR VIEWING A 3D DATA LANDSCAPE

(75) Inventors: Harry C. Pulley, IV, Guelph; Philippe F. Bertrand, Waterloo, both of (CA)

(73) Assignee: Visual Insights, Inc., Naperville, IL (US)

( * ) Notice: Subject to any disclaimer, the term of this patent is extended or adjusted under 35 U.S.C. 154(b) by 0 days.

(21) Appl. No.: 09/105,158

(22) Filed: Jun. 26, 1998

(51) Int. Cl.$^7$ .................................................. G06T 11/00
(52) U.S. Cl. ........................ 345/433; 345/355; 707/903
(58) Field of Search .................................. 345/355, 423, 345/425, 427, 433–439; 382/285; 395/125; 707/903

(56) References Cited

U.S. PATENT DOCUMENTS

| | | | |
|---|---|---|---|
| 5,861,885 | * | 1/1999 | Strasnick et al. ..................... 345/355 |
| 5,945,976 | * | 8/1999 | Iwamura et al. ..................... 345/139 |

* cited by examiner

*Primary Examiner*—Matthew Luu
*Assistant Examiner*—G. F. Cunningham
(74) *Attorney, Agent, or Firm*—Oliff & Berridge, PLC

(57) ABSTRACT

A navigation system and method for viewing a data landscape in an information visualization system employs constraints and positions for the rendering viewpoint which are defined relative to a bounding box enclosing objects within a volume of interest. The bounding box is resized to reflect changes in objects within the volume of interest including the addition or deletion of objects and/or the resizing of objects. The bounding box is also correspondingly repositioned whenever the volume of interest is repositioned. Constraints and/or positions defined relative to the bounding box are updated accordingly and are employed to control the movement and re-orientation of the rendering viewpoint within the volume of interest by the user. The user can select and/or define other volumes of interest within the data landscape, the bounding box for the entire landscape being the largest possible bounding box and the default volume of interest, and select predefined positions and orientations for the rendering viewpoint and/or store selected positions and/or orientations for future use.

4 Claims, 3 Drawing Sheets

NAVIGATION SYSTEM AND METHOD FOR VIEWING A 3D DATA LANDSCAPE

FIELD OF THE INVENTION

The present invention relates to a system and method for positioning a user viewpoint with respect to a three-dimensional rendered data set. More specifically, the present invention relates to a system and method for navigating a user viewpoint relative to a 3D data landscape within an information visualization system.

BACKGROUND OF THE INVENTION

Systems for representing information as rendered three-dimensional (3D) images are known. For example, the assignee of the present invention sells a product referred to as "Market Discovery" which can represent information such as financial information relating to stock or bond prices and trading activities as a 3D data landscape. Within this data landscape, various rendered 2D or 3D objects (such as blocks, surfaces, etc.) can represent different stocks, bonds or other items of interest and the condition (size, color, position, etc.) of the rendered object represents the present parameters (price, volume, percent change, etc.) of interest for that object.

Such systems, which are often referred to as information visualization systems, have proved to be well suited to representing large amounts of information and/or complex information in an efficient and relatively compact manner. For example, a variety of information, including pricing, size of bids and offers, etc. for the stocks comprising the Standard & Poors 500 can be displayed on a single computer display. Further, as is known, the displays produced within such information visualization systems can often be more readily understood by users than textual or other conventional representations.

It is typically desired by users of such information visualization systems to view the data landscape from more than a single fixed viewpoint and/or distance. Observing the data landscape from a different viewpoint can allow a user to: observe a subset of the objects within the data landscape which are presently of particular interest to the user; identify trends and/or correlation between various of the objects or sets of objects in the data landscape; etc. Similarly, changing the viewing distance ("zooming") allows a user to: choose to observe a single object in detail over a large part of the computer display's screen (e.g.—zoom in on a single object); observe many or all of the objects within the data landscape on the computer display's screen (e.g.—zoom out to a panoramic view of the data landscape); or to observe some subset of data landscape.

As will be apparent to those of skill in the art, the user viewpoint within the visualization system is merely the viewpoint to which the 3D representation of the data landscape is rendered. Essentially, the viewpoint can be thought of as the location and orientation of a camera which takes the picture of the data landscape which is being displayed on the computer display. Thus, the rendering engine within the visualization system responds to input from the user to change the desired viewpoint accordingly. When a new viewpoint position and/or distance is input by the user, the rendering engine re-renders the data landscape appropriately, as viewed from the new viewpoint.

When real time, or near-real time rendering is provided, the user can interactively update the viewpoint and observe the result substantially immediately, thus simulating the experience of the user moving with respect to the data landscape. Thus, the user can experience "flying" over or "walking" or "running" through the landscape, as desired.

While the sheer amount of information which can be represented within an information visualization system and the ease with which the representations employed within the landscape allow assimilation of the information by a user are some of the advantages offered by such systems, they can also lead to some difficulties and/or problems. For example, while most users of visualization systems want or require the ability to alter the viewpoint of the data landscape, it is not uncommon that a user becomes "lost" in the rendered image as the viewpoint is moved. This is due to several reasons, including the fact that such landscapes are often quite artificial constructions and there are few, if any, of the real world visual clues normally available to a person. Further, the physical clues (sense of balance and inertia to determine the rate and direction of movement, etc.) which are present in the real world are not provided within visualization systems. Thus, it is possible for a user to, for example, move the viewpoint sufficiently far away (zoom out) from the landscape and to direct the viewpoint away from the data landscape so that the landscape is not in view and the user is ignorant of how to locate the data landscape.

Previous attempts have been made to address this problem. For example, the above-mentioned Market Discovery product employed a set of constraints on how a user could orient and/or position the viewpoint. In particular, the viewpoint was constrained such that it was always perpendicular to the ground plane of the landscape such that roll of the viewpoint was not permitted and to move in polar coordinates (i.e.—latitude and longitude) centered at a user definable point of interest. While this navigation method was generally an improvement on prior methods, it was still unsatisfactory to many users and was found to be too limiting for developers constructing some data landscapes.

A subsequent attempt to improve this navigation method was made by changing it to a "helicopter-hemisphere" model wherein the viewpoint was constrained to be positioned on the surface of a hemisphere centered over a user selected point of interest on the landscape. The size of the hemisphere (e.g. the distance from the landscape, or the amount of zoom) could also be changed by the user. Four parameters were employed in this method to define a viewpoint position and orientation, namely: the bearing, which is the angle about the vertical (z) axis of the landscape, as measured clockwise from the −y axis; the tilt, which is the elevation above the horizon or "ground plane" of the landscape; the distance from the camera to the present point of interest; and the point of interest which is a user-defined point on the ground plane. An algorithm was also provided that would determine the path with the shortest distance between any two points on the hemisphere and the viewpoint could be moved along this determined path.

While this attempt was a significant improvement on the earlier described attempt, it still left much to be desired as users found it non-intuitive and unfriendly. Further, both it and the previously described attempt constrained the point of interest to points on the ground plane (x-y plane) of the landscape.

It is therefore desired to have an improved system and/or method of allowing users to alter their viewpoint of the data landscape which is intuitive to use and flexible for the users' needs but which helps prevent users from becoming lost within a rendered data landscape.

SUMMARY OF THE INVENTION

It is an object of the present invention to provide a novel system for and method of navigating a user viewpoint with respect to a three-dimensional rendered data set which obviates or mitigates at least one disadvantage of the prior art.

According to a first aspect of the present invention, there is provided method for navigating a user viewpoint of a rendered data landscape comprising at least one graphics primitive within an information visualization system, comprising the steps of:

(i) determining a bounding box for at least each graphics primitive in said rendered data landscape, each bounding box defining a volume which encloses said graphics primitive, said bounding box being resized and repositioned when a respective graphics primitive is repositioned, added, removed and resized in said rendered data landscape;

(ii) defining at least one constraint to limit movement of said user viewpoint, said at least one constraint being defined relative to one of said determined bounding boxes;

(iii) receiving input from a user representing a desired movement of said viewpoint with respect to said data landscape;

(iv) comparing said desired movement with said at least one defined constraint and effecting said desired movement to an updated position to the extent permitted within said at least one constraint;

(vi) re-rendering said data landscape from said updated position.

The present invention provides an improved method for navigating a rendering viewpoint with respect to a data landscape. The method allows one or more constraints to be defined for movement of the viewpoint to reduce the likelihood of a user becoming disorientated and/or lost within the landscape. The constraints can be expressed relative to a 3D bounding box which encompasses the graphics primitives within a selected volume of interest within the landscape. As the graphics primitives are repositioned, scaled, added or removed from the volume of interest, the bounding box is adjusted and the constraints updated accordingly. Similarly, viewpoint and point of interest positions can be defined relative to the bounding boxes.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
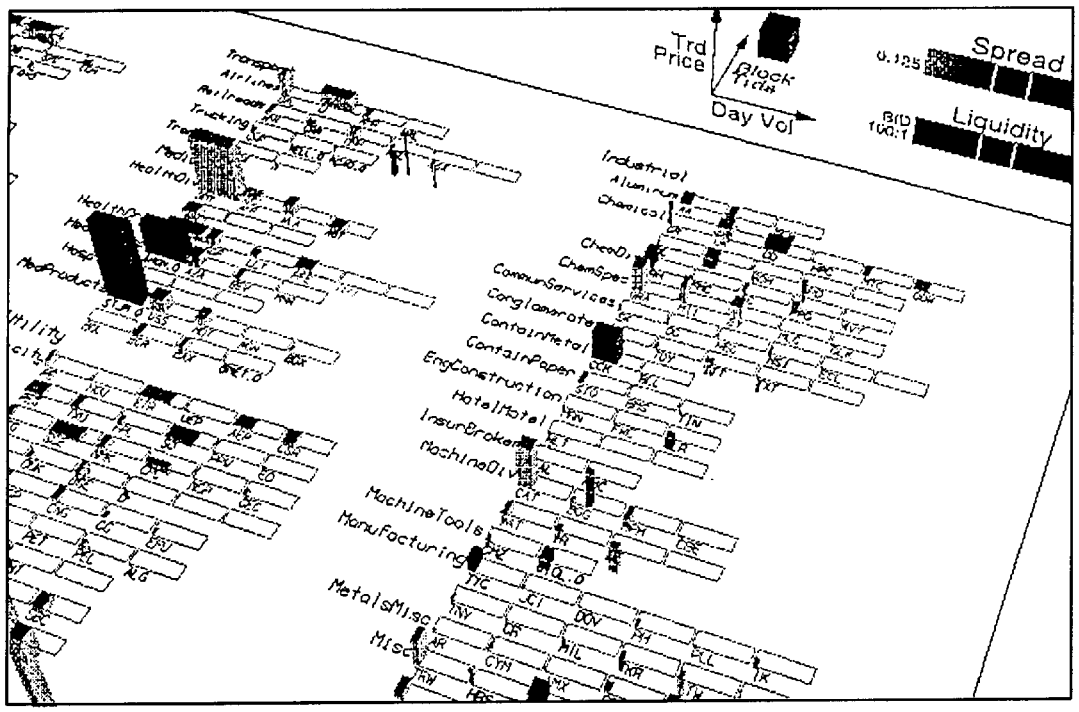
FIG. 1 shows a portion of a data landscape representing information about the stocks in the S&P 500 index.
Figure 2:
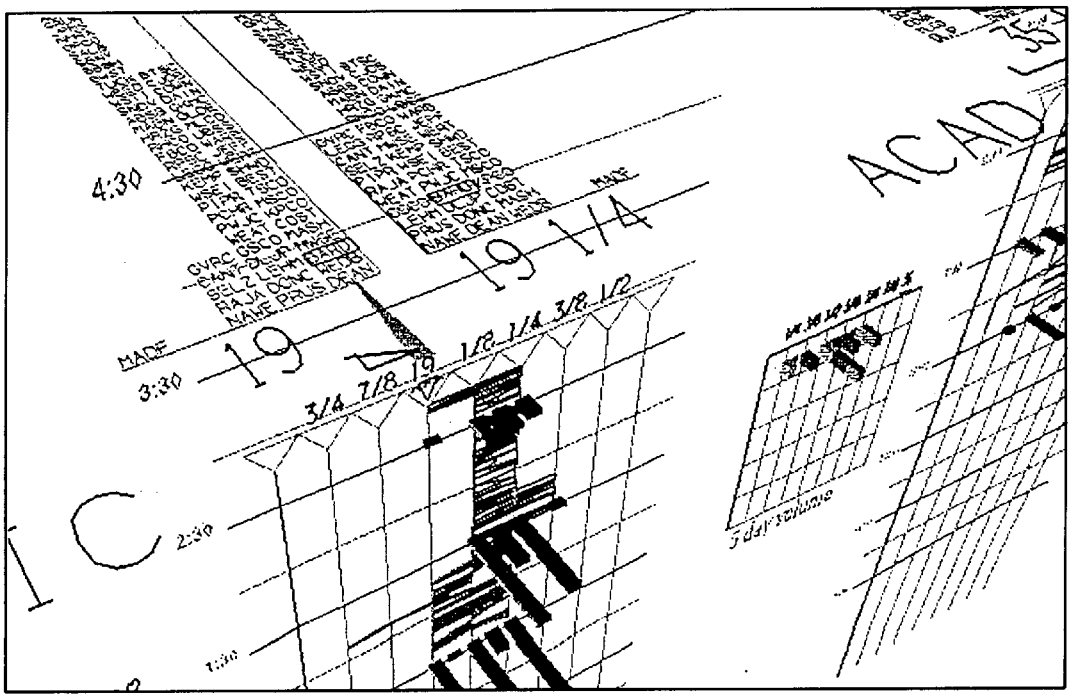
FIG. 2 shows a portion of a data landscape representing trading information about a selected group of stocks.

FIG. 1 shows a rendered portion of a data landscape showing pricing and trading information for the stocks in the S&P 500 index. FIG. 2 shows a rendered portion of a data landscape showing trading information on a previously selected group of equity instruments. As can be seen from these images and is discussed above, such data landscapes can be quite complex and it is not uncommon for a user to get "lost" in the rendered landscape when moving the viewpoint.

In the present invention, a hierarchy is employed to arrange objects within the data landscape. Turning now to FIGS. 3a through 3d, at the lowest level of the hierarchy are the visual primitives which are rendered. Such primitives include 3D volumes such as cubes (20 in FIG. 3a), 2D areas such as polygons, text (24 in FIG. 3b), etc. Frames are located above these primitives in the hierarchy and define useful groups of one or more primitives. For example, a primitive of cube 20 can be combined in a frame (28 in FIG. 3c) with text primitive 24 to obtain the labeled cube shown in FIG. 3c. At the top level of the hierarchy is the root frame (32 in FIG. 3d) which defines the group of frames and/or primitives within the landscape.

Each of the primitives, frames and the root frame has defined for it a bounding box 36. Each bounding box 36 defines the maximum (and a minimum) extent (volume) of the object. Bounding boxes 36 of child objects in the hierarchy are propagated to their parent objects. Thus, bounding box 36c of frame 28 is the sum of bounding boxes 36a of its child object cube primitive 20 and bounding box 36b of text primitive 24. Similarly, bounding box 36d of root frame 32 is the sum of the bounding boxes of the frames and primitives for which the root frame is the parent.

Figure 3A:
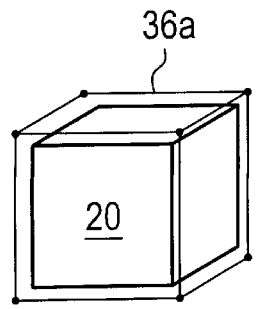
FIG. 3a shows a cube visual primitive and a bounding box of the primitive.
Figure 3B:
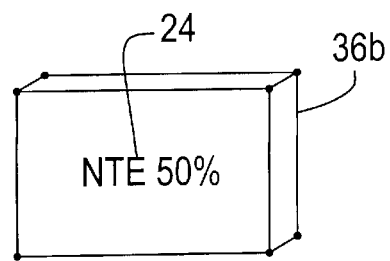
FIG. 3b shows a text visual primitive and a bounding box of the primitive.
Figure 3C:
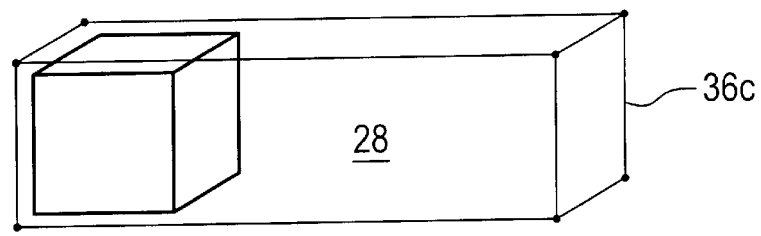
FIG. 3c shows a frame including the cube of FIG. 3a and the text of FIG. 3b and the bounding box of the frame.
Figure 3D:
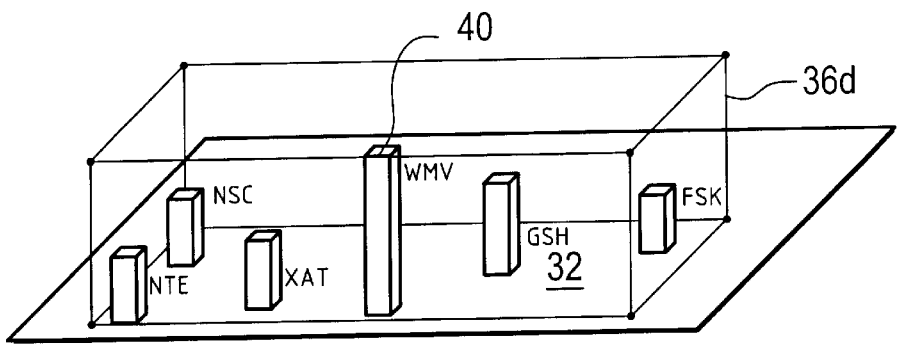
FIG. 3d shows a root frame including a plurality of cube and text primitives and frames and the bounding box of the root frame.
Figure 3E:
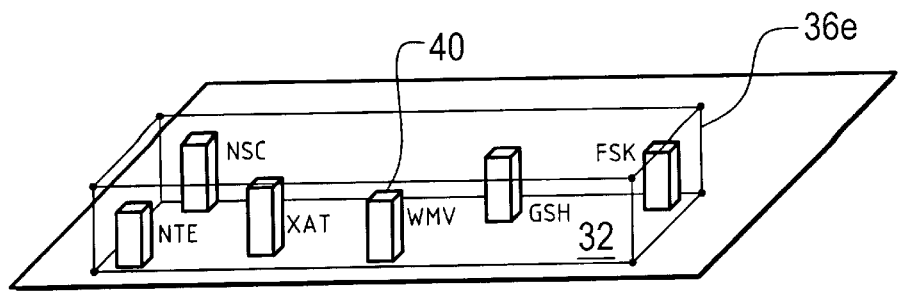
FIG. 3e shows the root frame of FIG. 3d wherein the size of a primitive has changed and the bounding box of the frame has been resized accordingly.

In visualization systems such as those sold by the assignee of the present invention, objects can be added, removed resized or repositioned in correspondence with changes in the underlying data they represent. In the present invention, the addition, removal, modification or repositioning of an object results in corresponding changes being made to the object's bounding box. These changes to the bounding box of a primitive are propagated up through the hierarchy so that the bounding box of any parent object is appropriately updated. FIG. 3e shows root frame 32 when the height of a column primitive 40 has been reduced, reducing the size of bounding box 36d accordingly.

In addition to the use of frames to advantageously group primitives, the bounding box of a frame can also be designated a volume of interest, either by the creator of the landscape or by a user. For example, each industry sector in the S&P index can be grouped in a separate frame and designated a volume of interest. In fact, a frame can be defined for even a single primitive and designated a volume of interest.

In the navigation method and system of the present invention the viewpoint is constrained with fixed constraints and constraints defined relative to the bounding box of a selected area of interest. Specifically, while an orientation (latitude, longitude and the axial rotation), a point of interest and a distance can be used to define a viewpoint, these parameters can be constrained in absolute or relative terms in relation to the current volume of interest. The definition by a user of the point of interest, distance and orientation of a viewpoint is accomplished by panning (moving the viewpoint and the point of interest in a selected direction with respect to the landscape), rotating (pitch, yaw and roll) and zooming (distance from the point of interest).

In a present embodiment of the invention, panning is constrained to keep the point of interest within the current volume of interest. Rotation is constrained to fixed constraints of −90° to +90° of pitch, 360° of roll and 360° of yaw. Zoom is constrained between 0% and 1000% of the optimal viewing distance, which is the distance at which the complete contents of the current volume of interest are within the area of the rendered display. These constraints are in fact maximum values/ranges and further constraints can be defined by the creator of the landscape. For example, the zoom constraint can be further limited to a range of 10% to 100%, etc.

Further, constraints and positions can be defined in absolute or relative terms. When defined in relative terms, the constraint and position values are appropriately scaled as the size and/or shape of the volume of interest changes. For example, if a viewpoint is positioned at the upper left corner of bounding box 36d in FIG. 3d and the height of primitive 40 changes as shown in FIG. 3e, the viewpoint will be repositioned in the upper left corner of bounding box 36e. Similarly, a viewpoint can be positioned within bounding box 36c of FIG. 3c and have a desired distance defined such that the viewpoint appears to be outside bounding box 36c (e.g.—a zoom of 10%). If bounding box 36c increases in size, the desired distance is increased accordingly, maintaining the zoom at 10%.

Also, positions can be defined in a relative manner. For example, a view point position or a point of interest can be defined relative to a volume of interest. This allows, for example, a viewpoint or point of interest to follow a volume of interest as it is repositioned with a landscape. Such relative positioning and/or constraints are particularly useful when viewing frames with highly dynamic size or position.

It is contemplated that in most circumstances a set of default constraints, such as the specific rotation, pan and zoom constraints mentioned above, will be appropriately defined by the creator of the data landscape. These default constraints can be augmented by the user of a landscape as desired. For example, a novice user can specify additional constraints, such as limiting pitch 0° to 90°, until the user becomes comfortable with navigating the data landscape.

It is also contemplated that the creator of a landscape will define default positions. For example, the creator of the S&P 500 data landscape of FIG. 1 can define a suitable position for each industry group. These default positions can be augmented by a user of a landscape, as desired. For example, a position can be defined by a user for each particular stock of interest, etc.

By default, the volume of interest is the bounding box of the root frame of the data landscape. A user can select a different volume of interest in any suitable manner, such as from a pop-up list box showing all defined volumes of interest, each of which will have an appropriate name assigned thereto. Further, predefined and user-defined positions and orientations can be stored for a data landscape allowing the user to immediately move from any position and/or orientation to a selected predefined position and orientation.

Figure 4:
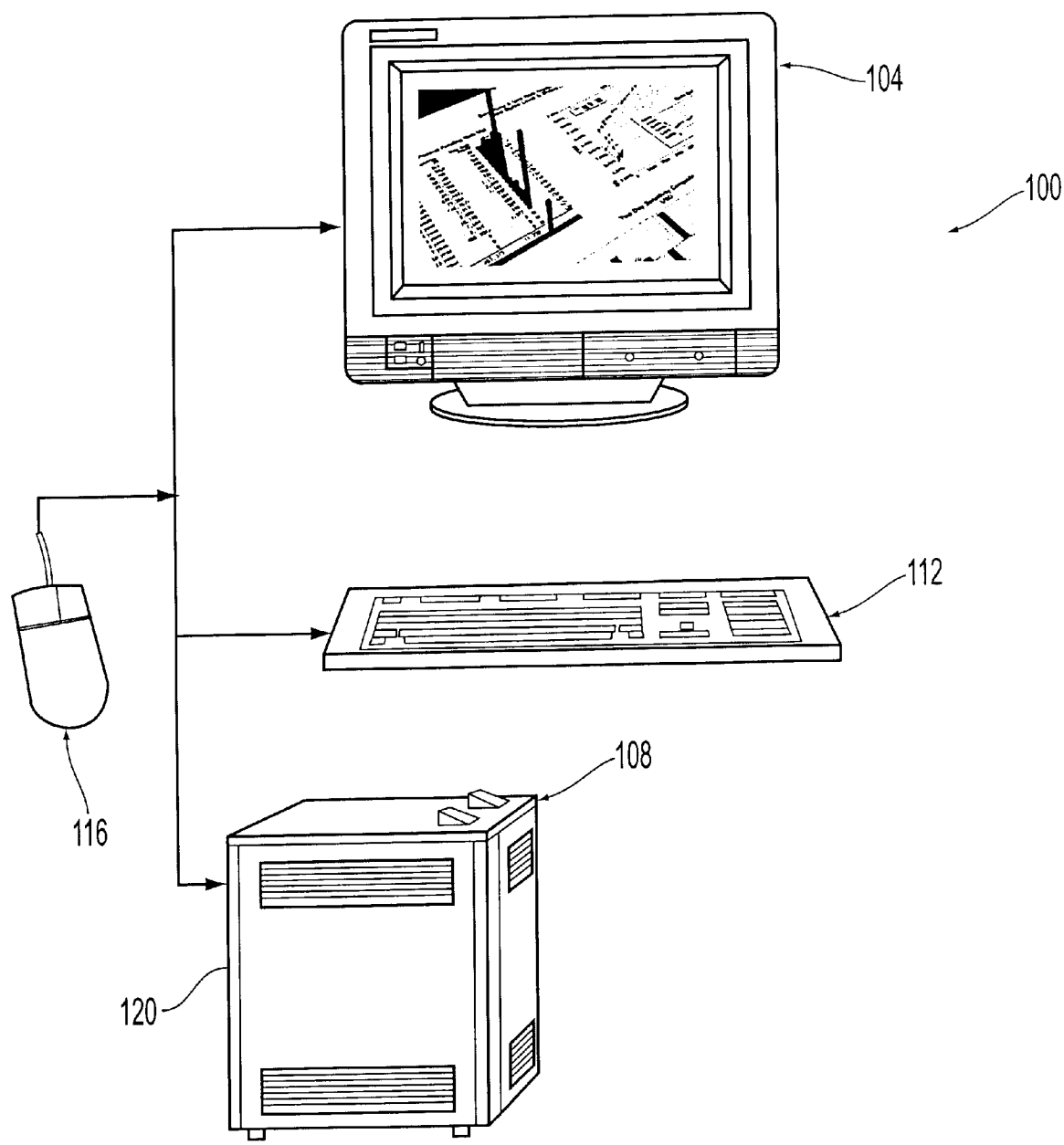
FIG. 4 shows a visualization system in accordance with the present invention.

FIG. 4 shows a visualization system 100 in accordance with an embodiment of the present invention. System 100 comprises an display 104 which is connected to a computer system 108, which can be any suitable computer system for executing a visualization system program. For example, computer system 108 can be a personal computer including a 400 MHz Pentium II processor and executing Microsoft Windows NT operating system or a Silicon Graphics Irix workstation. System 100 further includes input means, such as a keyboard 112 and a pointing device, such as a mouse 116 which are also connected to computer system 108. Further, computer system 108 can be connected, via a suitable network and/or telecommunications link 120 to one or more file servers and/or one or more information sources for information to be displayed by said visualization system.

As will be apparent to those of skill in the art, system 100 accepts data from the input means and/or communications link 120 and displays an appropriately rendered image on display 104 in accordance with a predefined data landscape. A user can reposition the viewpoint from which the image on display 104 is rendered, via keyboard 112, pointing device 116 or any other input device. Further, the user can augment constrains and/or positions provided within the predefined data landscape via input devices such as pointing device 116 or keyboard 112. As will be apparent to those of skill in the art, a user can input and/or modify positions and constraints via pop-up properties pages, menus or other common graphical user interface object as will occur to those of skill in the art.

We claim:

1. A method for navigating a user viewpoint of a rendered data landscape comprising at least one graphics primitive within an information visualization system, comprising the steps of:

(i) determining a bounding box for at least each graphics primitive in said rendered data landscape, each bounding box defining a volume which encloses said graphics primitive, said bounding box being resized and repositioned when a respective graphics primitive is repositioned, added, removed and resized in said rendered data landscape;

(ii) defining at least one constraint to limit movement of said user viewpoint, said at least one constraint being defined relative to one of said determined bounding boxes;

(iii) receiving input from a user representing a desired movement of said viewpoint with respect to said data landscape;

(iv) comparing said desired movement with said at least one defined constraint and effecting said desired movement to an updated position to the extent permitted within said at least one constraint;

(v) re-rendering said data landscape from said updated position.

2. The method according to claim 1 further comprising the step of defining at least one frame, said frame comprising two or more graphics primitives and, in step (i), determining a bounding box which encloses each of said at least two graphics primitives in said frame and, in step (ii) said constraint is defined relative to said determined bounding box for said frame.

3. A method for navigating a user viewpoint of a rendered data landscape within an information visualization system, the rendered data landscape comprising at least one graphics primitive, the method comprising:

(i) determining, for each of at least some of the at least one graphics primitive in the rendered data landscape, a bounding box for that graphics primitive, each determined bounding box defining a volume that encloses a bound graphics primitive, wherein, when a bound graphics primitive is at least one of repositioned, added, removed and resized in the rendered date landscape, the determined bounding box for that bound graphics primitive is at least one of repositioned, created, removed and resized;

(ii) defining at least one constraint that limits movement of the user viewpoint, wherein, for each constraint, that constraint is defined relative to one of the determined bounding boxes;
(iii) receiving input from a user representing a desired movement of the user viewpoint with respect to the rendered data landscape;
(iv) comparing the desired movement of the user viewpoint with the at least one defined constraint;
(v) effecting the desired movement to the extent permitted by the at least one constraint to reposition the user viewpoint to an updated position; and
(vi) re-rendering the rendered data landscape based on the update position of the user viewpoint.

4. The method of claim 1, wherein the at least one graphics primitive comprises a plurality of graphics primitives, the method further comprising:
defining at least one frame, each defined frame comprising at least two of the plurality of graphics primitives;
determining, for each of at least some of the at least one frame, a frame bounding box which encloses the at least two graphics primitives comprising that frame; and
defining at least one frame constraint that limits movement of the user viewpoint, wherein for each frame constraint, that frame constraint is defined relative to the determined frame bounding box for one of the at least one frame.

* * * * *